United States Patent [19]

Zagorski

[11] 3,960,734

[45] June 1, 1976

[54] HIGH EFFICIENCY CYCLONE SEPARATOR

[76] Inventor: Antoni Zagorski, 9431 Julie Beth St., Cypress, Calif. 90630

[22] Filed: July 8, 1974

[21] Appl. No.: 486,307

Related U.S. Application Data

[63] Continuation-in-part of Ser. No. 295,947, Oct. 10, 1972, abandoned.

[52] U.S. Cl. ............................. 210/512 M; 55/349; 55/449; 55/456; 55/458; 55/459 A

[51] Int. Cl.$^{2}$ .................... B01D 21/26; B01D 33/02

[58] Field of Search ............. 55/349, 423, 449, 452, 55/456, 458, 459; 209/144, 211; 210/512 R, 512 M

[56] References Cited

UNITED STATES PATENTS

| | | | |
|---|---|---|---|
| 1,541,337 | 6/1925 | Feix | 55/423 X |
| 2,005,305 | 6/1935 | Wagner | 55/423 X |
| 2,523,614 | 9/1950 | Elverum | 55/459 X |
| 2,687,780 | 8/1954 | Culhane | 55/349 X |
| 3,169,842 | 2/1965 | Streete et al. | 55/449 |
| 3,288,300 | 11/1966 | Bouchillon | 55/459 X |
| 3,337,050 | 8/1967 | Labecki | 209/211 |
| 3,481,118 | 12/1969 | Willis et al. | 55/459 X |
| 3,724,176 | 4/1973 | Vishnevsky et al. | 55/349 X |
| 3,850,816 | 11/1974 | Koch | 210/512 |
| 3,883,332 | 5/1975 | Llewelyn et al. | 55/459 |

FOREIGN PATENTS OR APPLICATIONS

| | | | |
|---|---|---|---|
| 655,780 | 1/1938 | Germany | 55/349 |

*Primary Examiner*—Frank W. Lutter
*Assistant Examiner*—Kathleen J. Prunner
*Attorney, Agent, or Firm*—Raymond L. Madsen

[57] ABSTRACT

A cyclone separator having a central fluid conduit. An interceptor ring is externally attached to the end of the fluid conduit and has a surface which intercepts fluid flowing longitudinally along the outer surface of the fluid conduit and directs the fluid outwardly toward the interior wall of the container. Circumferential and longitudinal slots are located in the container in proximity to the interceptor ring to enhance the outward direction flow of fluid from the ring. A diffuser collar having a central opening therein is connected to the interceptor ring in a manner leaving an annular space or circumferential slots between the ring and the collar through which space unwanted materials.

In an alternate version the diffuser collar is larger in diameter than the fluid conduit and the conduit extends into the diffuser collar forming a space therebetween by which an outer layer of fluid is skimmed from the spiraling column of fluid entering the fluid conduit to further cleanse the fluid of unwanted substances. Curved vanes connect the diffuser collar to the fluid conduit. The open end of the diffuser collar may also have an interceptor ring and the container may have a circumferential slot in proximity to the interceptor ring to enhance the direction of fluids outwardly from the interceptor ring.

In still another version, a second container may be symmetrically located interior to the first container to surround the one end of the fluid conduit. One end of the second container is connected to the fluid deflector apparatus and the other end is open.

11 Claims, 9 Drawing Figures

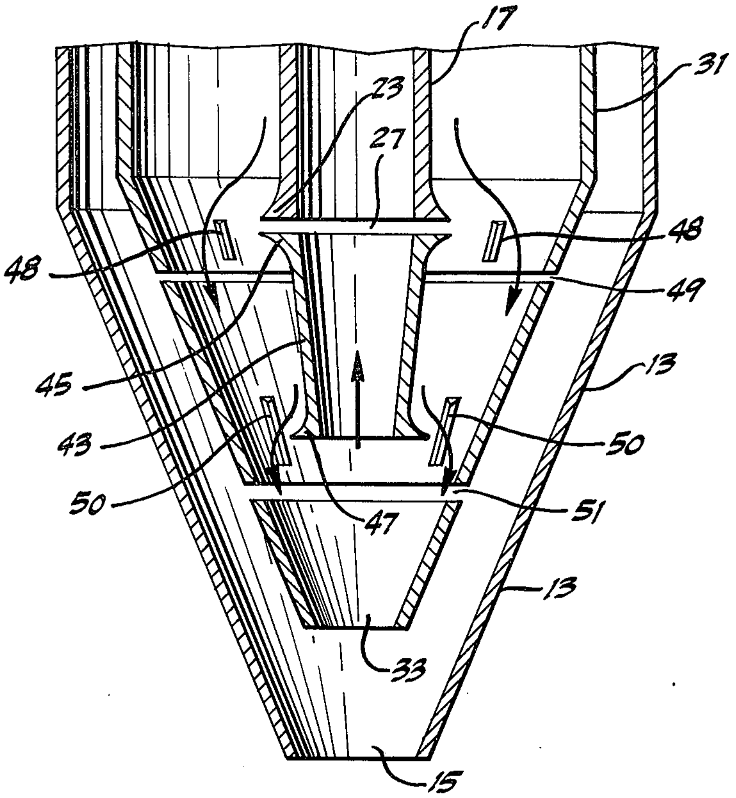
Fig. 7
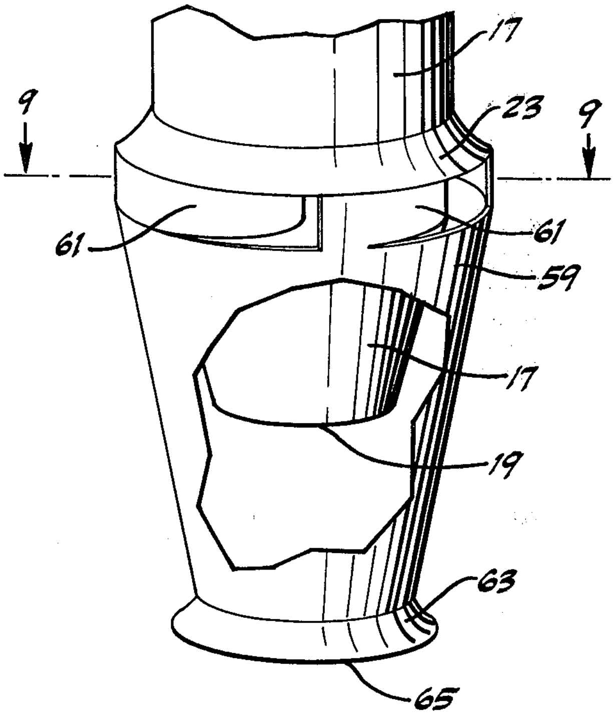
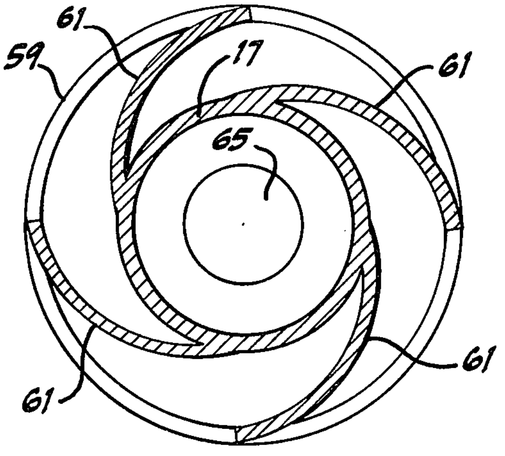
Fig. 9
Fig. 8

HIGH EFFICIENCY CYCLONE SEPARATOR

This is a continuation in part of application Ser. No. 295,947, filed Oct. 10, 1972 and now abandoned.

The present invention relates to fluid separators and more particularly to cyclonic motion fluid and particulate matter separators. In the field of fluid and gas cleaning, it has been the general practice to employ cyclone separators to perform the separation of unwanted materials and substances from the fluids and gases by the centrifugal forces imparted to such substances and materials through spiral motion. Although such devices have served the purpose, they have not proved entirely satisfactory under all conditions of service for the reason that considerable difficulty has been experienced in obtaining a high level of efficiency of separation and difficulties encountered in making the efficiency accurately predictable within practical limits of operation. A typical prior art cyclone separator is disclosed in U.S. Pat. No. 3,060,664, issued to Morawski.

Those concerned with the developement of cyclone separators have long recognized the need for increased efficiency of separation. The present invention fulfills this need.

One of the most critical problems confronting designers of cyclone separators has been to obtain a highly efficient level of separation of unwanted materials or substances from fluids and gases without increasing the pressure drops within the separator. This problem is overcome by the present invention.

A further problem in obtaining high efficiency has been the increase in complexity and cost. This is overcome by the present invention.

Another area of concern which has confronted designers of cyclone separators has been the creation of a flexible design through which certain devices may easily be added to improve efficiency as required. The present invention fulfills this need.

Another problem confronting designers is the need for a separator which can be installed inside a process vessel such as a catalytic reactor or regenerator without the necessity of using any other type of separator such as an electroprecipitator or baghouse filter for further cleaning of the gas or fluid. The present invention fulfills this need.

It is well known to designers that the gas flow pattern through conventional cyclone separators is strongly influenced by interaction between the descending sprial rotation of the contaminated fluid mixing with the upward to ascending sprialing vortex of fluid cleansed of contaminants. This interaction generates eddy currents within the fluid. Since at the center of the spiraling fluid the pressure is lower than the pressure at the outer extremities, the eddy currents of the fluid move toward the center. These eddy currents reduce the efficiency of the cyclonic action of the separator.

There are three basic regions of eddy currents in the conventional cyclone separator. The first region of eddy currents of interest are generated in the upper portion of the separator body surrounding the fluid conduit through which the cleansed fluid moves. In this region the circular or toroidal current of fluid is heavily laden with contaminants, especially in the layer which is adjacent to the walls of the outer container boundary. The second region of eddy currents occurs along the edge of the opening to the fluid conduit where the descending heavily contaminated fluid intercepts and mixes with the ascending spiraling vortex of cleansed fluid. The third region of eddy currents is produced below the opening to the fluid conduit by the interaction between the descending and ascending spirals. All of these regions of eddy currents contribute to the degradation of efficiency of separation of unwanted contaminants from the fiuid.

It is well known that the generation of eddy currents in a conventional cyclone separator can be influenced considerably by the geometry of the container body and also by changes in the velocity of the spiraling fluid. However, neither changes in geometry or fluid velocity can eliminate all of the eddy current regions. The present invention improves the efficiency of separation of a conventional cyclone separator by preventing the entrance to the fluid conduit of contamination from the eddy currents in the upper region surrounding the fluid conduit and the eddy currents around the opening to the fluid conduit and by providing a structure which tends to separate the downward and upward spiraling fluids as well as a structure to skim the outer extremities of the upward spiraling vortex of cleansed fluid and to recirculate the skimmed portion to further remove remaining contaminants.

The general purpose of this invention is to provide a cyclone separator which embraces all the advantages of similarly employed separators and possesses none of the aforedescribed disadvantages. To attain this, the present invention contemplates a unique combination and arrangement of an interceptor ring, diffuser collar, container slots, and an interior concentric container whereby simplicity and low cost of construction are obtained along with increased efficiency of separation.

An object of the present invention is the provision of increased efficiency of separation of unwanted substances and materials from fluids and gases in a cyclone separator.

A further object of the invention is the provision of an efficiency for a fluid or gas cleaning process whereby the necessity of using any other type of separators and filters is eliminated.

Still another object is to provide a flexible cyclone separator design to which devices may be easily added to improve the efficiency of separation as required while keeping the cost low and construction simple.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 7 illustrates a cross-section view, partly in section, of an alternate embodiment of the present invention showing circumferential and longitudinal slots in a double shell structure;

FIG. 8 illustrates a tapered fluid conduit with a surrounding diffuser collar, deflecting vanes and interceptor ring; and FIG. 9 illustrates a cross-section view of the fluid conduit and diffuser collar of FIG. 8, taken along line 9—9 in the direction of the arrows.

Figure 1:
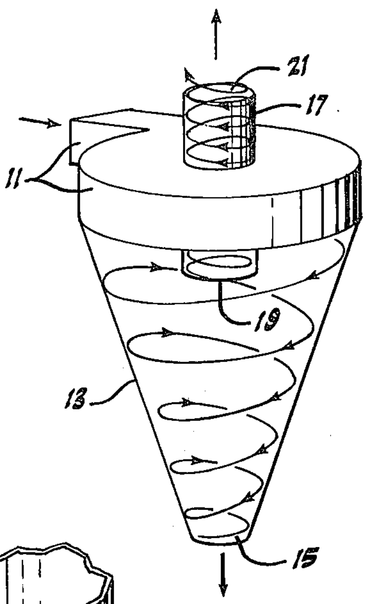
FIG. 1 illustrates a pictorial view of the principle elements of a prior art cyclone separator.

Referring now to the drawings wherein like reference characters designate like or corresponding parts throughout the several views, there is shown in FIG. 1 (which illustrates the principle elements of a prior art cyclone separator) a cyclone separator having a scroll deflector 11 for imparting circular motion to a fluid flowing therein which in turn is connected to conical container 13 which has an opening 15 at the apex thereof oppositely disposed deflector 11. Fluid conduit 17 is located on the centerline of container 13 and has one end 19 centrally located within container 13 and passes through deflector 11 having the other end 21 opening external to the cyclone separator.

The arrows indicate the direction of motion of the fluid showing the cyclonic or spiral motion within the container and within the fluid conduit. It is to be noted that a central fluid vortex is formed in the container which vortex spirals into one end 19 of the fluid conduit and exits from the other end 21.

Figure 2:
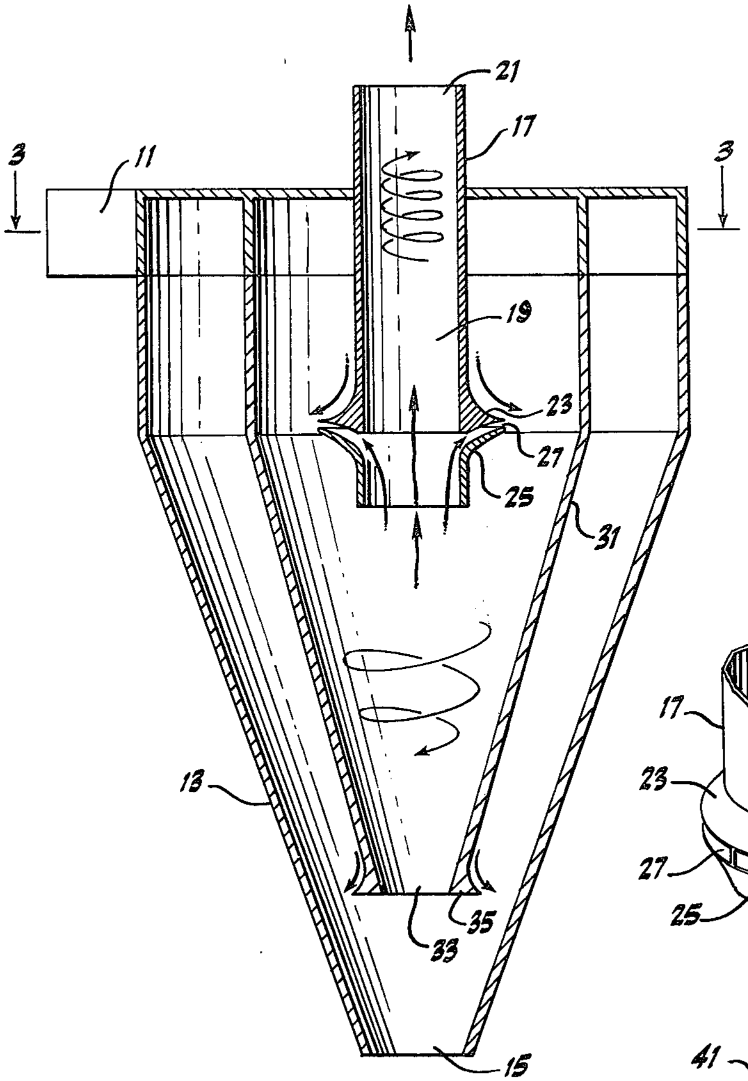
FIG. 2 illustrates a cross section cut-away view of a preferred embodiment of the invention.

FIG. 2 illustrates a preferred embodiment of the present invention in a cross section cut-away view showing scroll deflector 11 connected to container 13 with fluid conduit 17 having opening 19 centrally located within container 13 and passing through deflector 11 with opening 21 external to the separator. Interceptor ring or flange 23 is attached external to fluid conduit 17 adjacent to opening 19 and extends radially outward therefrom. Diffuser collar 25 has a flared end which is connected to interceptor ring 23 in a manner leaving an annular space or series of circumferential slots 27 between the ring and the collar. The annular space is not flat, but curved, and follows the flare of the diffuser collar.

Figure 6:
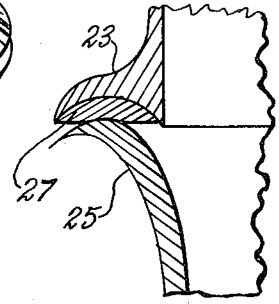
FIG. 6 illustrates a portion of a cross-section view of a tapered version of the interceptor ring and diffuser collar of FIG. 2.

It is to be noted that the flared edge or end of diffuser collar 25 spaced adjacent interceptor ring 23 normally does not dimensionally extend beyond the outer extremity or largest circumference of interceptor ring 23. This prevents fluid moving longitudinally along the outer surface of conduit 17 from being intercepted by the flared edge of diffuser collar 25. However, the flared end of diffuser collar 25 and the spaced adjacent surface of interceptor ring 23 may be curved to the extreme that the annular space therebetween is semi-circular in cross section as illustrated in FIG. 6 and under these circumstances, the diffuser collar may extend beyond the interceptor ring as illustrated. The largest diameter of interceptor ring 23 and the diameter of the flared end of diffuser collar 25 normally are substantially the same for further reasons discussed hereinbelow in connection with the description of operation.

A second container 31 is symmetrically and concentrically located and uniformly spaced within container 13 and is attached to deflector 11. Container 31 surrounds fluid conduit 17, and interceptor ring 23 and diffuser collar 25 attached thereto. Container 31 has opening 33 therein oppositely disposed deflector 11. A second interceptor ring or flange 35 is connected adjacent to opening 33 of container 31 and on the exterior surface thereof similar to interceptor ring 23 attached to fluid conduit 17. The double shell container finds greater utility in large diameter structures.

Figure 3:
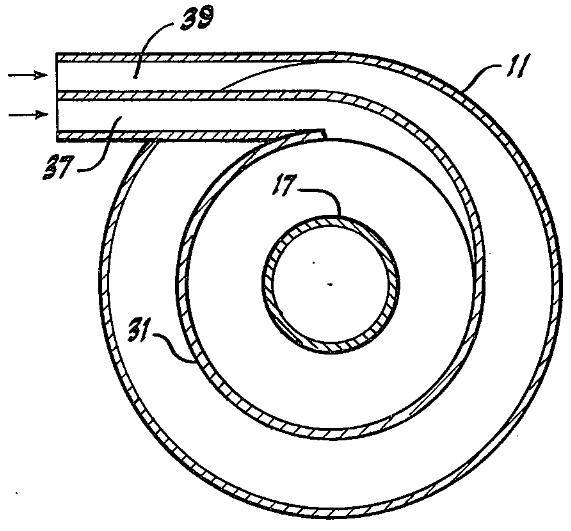
FIG. 3 illustrates a cross section cut-away view of the embodiment illustrated in FIG. 2 taken on line 3—3 of FIG. 2 looking in the direction of the arrows showing a double inlet scroll deflector.

FIG. 3 illustrates a cross-section view taken on the line 3—3 of FIG. 2 looking in the direction of the arrows into a particular embodiment of scroll deflector 11. Fluid enters into deflector 11 through channels 37 and 39 which generate the circular motion of fluid resulting in the cyclonic or spiral path in the region between container 31 and fluid conduit 17 and the region between container 33 and container 31, respectively.

Figure 4:
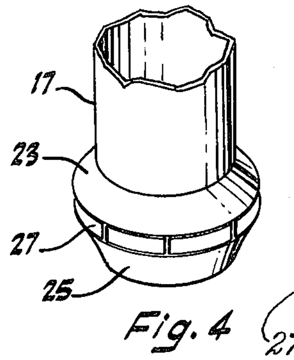
FIG. 4 is a pictorial view of the fluid conduit portion of FIG. 2.

FIG. 4 illustrates a pictorial view of a second embodiment of fluid conduit 17 with interceptor ring 23 and diffuser collar 25 attached thereto. Annular opening 27, which may be a series of circumferential slots, separates interceptor ring 23 from diffuser collar 25.

Figure 5:
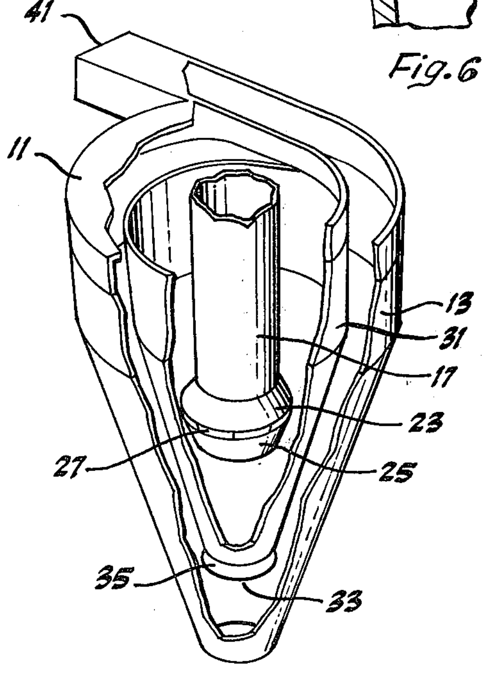
FIG. 5 illustrates a cut-away view of a preferred embodiment of the invention showing a single channel scroll deflector.

Turning now to FIG. 5 there is illustrated a cut-away pictorial view of another embodiment of the present invention showing a scroll deflector 11 with a single fluid channel 41 rectangular in cross-section. As the channel enters the interior of deflector 11, one side of channel 41 mates with and becomes attached to container 13 and the opposite side of channel 41 continues into the interior of the deflector and mates with and becomes attached to the upper end of container 31 leaving an opening from channel 41 into the space between containers 13 and 31. In FIG. 5, container 31 does not continue to the upper surface of deflector 11 as is illustrated in FIG. 2 and FIG. 3. Fluid conduit 17 is concentrically located within container 31 as illustrated in FIG. 2. Interceptor ring 23 is separated from diffuser collar 25 by annular space 27 and is attached to the end of conduit 17 similar to FIG. 2. A second interceptor ring 35 is illustrated on the exterior surface of container 31 adjacent opening 33 therein.

FIG. 6 illustrates a portion of interceptor ring 23 and diffuser collar 25 carried to a semi-circular flare. This further prevents the interception of fluid traversing the outer surface of conduit 17 and ejects fluid radially outward from the interceptor ring. It also further enhances the pressure differences between the interior and exterior of the diffuser collar to foster the flow of fluid from the interior surface of the diffuser collar out the annular space between the diffuser collar and the interceptor ring.

FIG. 7 illustrates a portion of an alternate version of the present invention in cross section showing a tapered diffuser collar and an inner container having circumferential and longitudinal slots. Tapered diffuser collar 43 is located adjacent the end of fluid conduit 17 with interceptor ring 23 thereon. Diffuser collar 43 has flared end or flange 45 which mates with interceptor ring 23 to form annular space 27 therebetween. The smaller or tapered end of diffuser collar 43 has interceptor ring 47 located exterior thereto and adjacent the opening thereof. Container 31 has spaced longitudinal slots 48 and circumferential slot 49 located in proximity to interceptor ring 23 and flange 45 and has spaced longitudinal slots 50 and circumferential slot 51 located in proximity to interceptor ring 47. Outer container 13 surrounds container 31 and slots 48, 49, 50 and 51 and has open end 15 disposed opposite opening 33 in container 31.

FIG. 8 illustrates an alternate version of a diffuser collar mounted on fluid conduit 17. Fluid conduit 17 has interceptor ring 23 attached thereto and extends through interceptor ring 23 in the form of a tapered conical section, tapering to opening 19. Diffuser collar 59 is attached to interceptor ring 23 and is larger in diameter than fluid conduit 17 so as to provide a space or separation between diffuser collar 59 and fluid conduit 17. Diffuser collar 59 is tapered substantially to math the taper of fluid conduit 17 and extends beyond opening 19 of fluid conduit 17. Vanes 61 are formed in diffuser collar 59 adjacennt interceptor ring 23 to provide openings from the interior space between conduit 17 and diffuser collar 59. Vanes 61 spiral inwardly from the exterior surface of diffuser collar 59 to contact and connect to fluid conduit 17 for support. Diffuser collar 59 extends beyond and surrounds opening 19 in fluid conduit 17 and has opening 65 therein to which interceptor ring 63 is connected; and FIG. 9 shows spiral vanes 61 connecting fluid conduit 17 with diffuser collar 59.

Operation of a typical cyclone separator can best be described by first referring to the prior art apparatus illustrated in FIG. 1. Fluid enters into scroll deflector 11 where it receives a circular motion. The continued entry of fluid into the deflector forces the circular motion to spiral downward into container 13 toward opening 15 in the direction of the spiral arrow, in the manner of a "cork-screw" or cyclone. Container 13 is tapered or conical in shape to build up speed as the fluid spirals toward opening 15. This build up of velocity causes substantially all of the fluid to enter opening 19 into fluid conduit 17 and out opening 21. by adjustably positioning 19 of fluid conduit 17 within container 13 and by also adjusting the size of opening 15, a balance of fluid pressures can be created to cause very little fluid loss out of opening 15 and substantially all of the fluid to exit through the fluid conduit 17 and opening 21.

The sprial motion imparted to the fluid within container 13 results in a centrifugal force being generated upon the fluid and the substances and materials contained therein. The substances and materials having a mass or density per unit volume greater than the fluid have a tendency to travel outwardly away from the central region of container 13. As the materials come in contact with the interior surface of container 13, their spiral motion is slowed by the surface friction and the materials are pulled downward and out opening 15 by the force of gravity. Therefore, the central portion of container 13 contains fluid substantially free from unwanted materials and substances. This "clean" fluid then progresses spirally through fluid conduit 17 and out of opening 21.

The operation of the present invention is best described by turning to FIG. 2. The circular motion imparted to the fluid by deflector 11 causes the fluid to circulate around fluid conduit 17 and to progress downwardly toward opening 33 in container 31. In the process of this spiral action, some of the unwanted substances and materials in the fluid have a tendency to cling to the outer surface of fluid conduit 17. As the unwanted substances and materials migrate along the outer surface of conduit 17 toward opening 19 in fluid conduit 17, some of the unwanted substances and materials enter into opening 19 and contaminate the "clean" fluid flowing therein from the central region of container 13. In order to prevent this unwanted entry and contamination, the interceptor ring or flange 23 is located adjacent the end of fluid conduit 17 and has a surface which deflects the unwanted substances and materials outwardly into the main body of the fluid where the centrifugal forces of the spiral motion impinge the unwanted substances and materials against the interior surface of container 31 and then out of opening 33.

It has been further observed than an inherently new and useful result is obtained from the combination of diffuser collar 25 and interceptor ring 23. The fluid deflected radially outward by interceptor ring 23 produces a region of lower fluid pressure adjacent annular space 27 and forces the fluid of higher pressure moving along the inner walls of the diffuser collar 25 to exit out of annular space 27. Therefore, in addition to the centrifugal force acting on the fluid spiraling through the diffuser collar and interceptor ring, differences in fluid pressure enhance the removal of fluid moving adjacent the inner walls of diffuser collar 25 out through annular space 27. This pressure action results in the removal of the more contaminated fluid adjacent the walls of diffuser collar 25. In order to achieve this result, the largest diameter of interceptor ring 23 and the spaced adjacent flared edge of diffuser collar 25 are substantially the same. The semi-circular flare of FIG. 6 further enhances the differences in fluid pressure and prevents interception of fluid flowing external to the assembly of the ring and collar.

Therefore, to further enhance the separating or cleaning action, diffuser collar 25 can be added adjacent to the interceptor ring separated by a series of circumferential slots or annular space 27 whereby the spiral motion of fluid entering into fluid conduit 17 through diffuser collar 25, which may be contaminated by unwanted substances and materials, can be further cleaned by allowing the unwanted substances and materials in spiral motion to be expelled through annular opening 27 by centrifugal and pressure forces imparted thereto.

Consequently, a more efficient separating or cleaning action in the fluid can be achieved by the interceptor ring and diffuser collar by utilizing each of these elements singularly or in combination with one another.

A still further improvement in the separating or cleaning action of the present invention is provided by concentric container or shell 13 illustrated in FIG. 2 and FIG. 5. The spiral motion of fluid within container 13 imparts a centrifugal force to the unwanted substances and materials within the fluid causing them to contact the interior surface of container 13 and to spiral downwardly and out the opening 15 in container 13. The spiral motion of fluid into the upper regions of container 13 may be imparted by the scroll deflector illustrated in FIG. 3. Two channels 37 and 39 direct the fluid entering deflector 11 into the upper region of container 31 and also into the upper region between container 13 and container 31. Therefore, the fluid is divided into two concentric spiral regions providing two simultaneous centrifugal separating actions. Consequently, the average distance the unwanted substances and materials travel before contacting a surface for removal is reduced by one-half.

An alternate scroll deflector is illustrated in FIG. 5 wherein the fluid enters through a single channel 41 and divides between the upper region of container 31 and the upper region between container 31 and 13 after circular motion is imparted to the fluid flow. In this structure, the higher velocity particles and the more dense and heavy unwanted substances and materials tend to enter the region between container 13 and 31 so that there is an initial separating action before the fluid begins the spiral descent through container 31 and the region between container 31 and 13. Therefore, container 31 additionally provides a boundary between the more contaminated fluids in the region between container 31 and 13 and the spiral fluid flow of the less contaminated fluid in container 31.

Once the unwanted substances and materials contact the interior wall of container 31, they sprial downwardly and out the opening 33 in container 31 into the central region of container 13 where they again experience the centrifugal forces of the spiral motion of the fluid whereby they are driven outwardly to the walls of container 13 to finally exit through opening 15.

Interceptor ring or flange 35 may be added adjacent the opening 33 in container 31 similar to the interceptor ring mounted adjacent opening 19 and fluid conduit 17. Therefore, fluid which may flow longitudinally along the outer surface of container 31 due to electrostatic forces and aerodynamic forces within the fluid, is deflected outwardly by interceptor ring 35 into the spiral motion of the fluid between container 31 and 13. Once introduced into the spiral motion of the main body of the fluid, the unwanted substances and materials are driven outwardly by centrifugal force to the walls of container 13 where they then spiral downwardly and out of opening 15 and are thereby separated from the fluid.

In order to enhance the effect of the interceptor rings, circumferential and longitudinal slots may be located in conical container 31 as illustrated in FIG. 7. As the fluid spirals downwardly exterior to fluid conduit 17 in the region between fluid conduit 17 and container 31, the fluid adjacent the surface of fluid conduit 17 is intercepted by interceptor ring 23 and directed outwardly. This causes turbulence to occur in the region of the extremities of the interceptor ring. The effect of the turbulence is to cause mixing in the spiraling fluid and to degrade the separating effects of the spiraling motion. By locating a plurality of spaced longitudinal slots 48 and/or circumferential slot 49, in proximity to interceptor ring 23, a region of reduced pressure is produced at the circumferential or longitudinal slots thereby causing the fluid intercepted by interceptor ring 23 to be directed outwardly toward the slots to smooth out the flow of fluid and to prevent the formation of unwanted eddy currents. The slots, therefore, enhance the separation of contaminants from the fluid and improve the efficiency of separation of the cyclone separator. Similarly, in proximity to the open end of diffuser collar 49 with interceptor ring 47, a plurality of spaced longitudinal slots 50 and/or slot 51 is located to prevent the formation of eddy currents adjacent the opening to diffuser collar 49. Without longitudinal slots 50 or circumferential slot 51, the eddy currents formed around or in the vicinity of diffuser collar 47 would mix contaminated fluid with the relatively uncontaminated rising fluid vortex entering the opening to diffuser collar 49, degrading the efficiency of separation. The low pressure region created by longitudinal slots 50 or circumferential slot 51 directs the fluid outwardly away from interceptor ring 47 in a smooth non-turbulent flow as indicated by the arrows and improves the efficiency of separation from the fluid of contaminants. Although the circumferential slots in container 31 are located somewhat below interceptor rings 23 and 47, it should be noted that other circumferential and longitudinal slot locations are anticipated in connection with other shapes or forms of interceptor rings and diffuser collars. It should also be noted that the circumferential or longitudinal slots may be used separately or in combination as illustrated to obtain the fluid separating results desired.

An alternate diffuser collar is illustrated in FIG. 8 which collar fits concentrically over the conical tapered end of fluid conduit 17. Here, the sprialing vortex of fluid entering opening 65 of diffuser collar 59 has a fluid sheath skimmed from the outer extremities thereof, which sheath flows between the outer surface of fluid conduit 17 and the inner surface of diffuser collar 59. As this skimmed sheath spirals upwardly, the fluid is intercepted by spiral louvers or vanes 61, which eject the fluid from between diffuser collar 59 and fluid conduit 17 outwardly into the path of the descending spiral of contaminated fluid. The outward motion of fluid from spiral vanes 61 intersects the fluid deflected outwardly by interceptor ring 23 and further enhances the outward motion of fluid from the interceptor ring. Interceptor ring 63 adjacent opening 65 of diffuser collar 59 also directs contaminated fluid flow on the outer surface of diffuser collar 59 in a radially outward direction to prevent the entrance of contaminated fluid into opening 65 of diffuser collar 59. It should be noted that the assembly of FIG. 8 may be utilized to replace the interceptor ring and diffuser collar in the configuration of FIG. 7.

To further illustrate the structure of FIG. 8, FIG. 9 shows a cross section taken along line 9—9 of FIG. 8 in the direction of the arrows displaying spiral vanes 61 connecting together diffuser collar 59 and fluid conduit 17. Since the fluid vortex entering opening 65 of diffuser collar 59 is in spiral motion, the contaminants within the vortex are forced to the outer extremities thereof by the centrifugal force of the spiral motion. Consequently, by skimming the outer sheath of this vortex of fluid entering into fluid conduit 17, further improvement in contaminant separation is achieved. The skimmed fluid is then deflected by the spiral vanes back into the main body of the cyclone separator to further experience spiral motion and separation of the contaminants contained therein.

It now should be apparent that the present invention provides an interceptor ring, diffuser collar and an interior container with circumferential and longitudinal slots which may be employed in conjunction with a cyclone separator for further separating unwanted substances and materials such as particulate matter from a fluid or gas flowing spirally therein by directing longitudinal flow of fluid back into the spiral main stream and reducing eddy currents whereby the more heavy and dense unwanted substances and materials are prevented from contaminating the clean fluid in the central regions and by providing an interior concentric shell to which the unwanted substances and materials can be directed for enhanced separation from the fluid.

Although particular components, etc., have been discussed in connection with a specific embodiment of a cyclone separator constructed in accordance with the teachings of the present invention, others may be utilized. Furthermore, it will be understood that although an exemplary embodiment of the present invention has been disclosed and discussed, other applications and mechanical arrangements are possible and that the embodiments disclosed may be subjected to various changes, modifications, and substitutions without necessarily departing from the spirit of the invention.

What is claimed is:

1. In a cyclone separator of the type having a fluid deflector attached to and closing the base of a conical container and wherein the fluid deflector comprises means adapted to receive and isert fluid in circular motion about the axis of the conical container, which container has an outlet at the apex thereof from which unwanted materials and substances of a mass and density greater than the fluid centrifugally impinged against the inner surface thereof by the circular motion of the fluid may exit therefrom and be removed from the fluid and wherein a fluid conduit is located along the axis of the conical container and passes through the center of the fluid deflector, which conduit has one end centrally located within the conical container and the other end located external thereto, and wherein an axial vortex of fluid separated from the unwanted materials and substances is formed in the container, which vortex spirals into the one end of the fluid conduit and exits from the other end, the improvement comprising:

an interceptor ring attached externally to the one end of the fluid conduit centrally located within the conical container, said ring being juxtaposed the edge of the opening in the one end of the fluid conduit and extending radially outward from the outer surface of the conduit to intercept fluid which flows longitudinally along the outer surface of the conduit and deflect said longitudinal flow radially outward from the outer surface of the conduit whereby unwanted materials and substances are impinged against the interior surface of the conical container and exit through the apex opening therein; and a diffuser collar having a cylindrical section with two ends, one end being flared radially outward and having a diameter substantially the same as the diameter of said interceptor ring, said diffuser collar being axially aligned with and having the one flared end spacially connected to said ring in a manner leaving a circumferential slot between said ring and said one flared end of said collar whereby the unwanted materials and substances entering into the conduit through said collar may exit through said slot in response to the centrifugal force of the fluid vortex and the radial force directed outwardly through said slot and produced by the pressure difference between the reduced pressure created by fluid deflected radially outward from the outer surface of the conduit by said interceptor ring adjacent the interior of said slot and by the increased pressure created by the fluid vortex spiraling into the diffuser collar adjacent the interior of said slot thereby obtaining further separation of unwanted materials and substances from the fluid.

2. The cyclone separator described in claim 1 wherein said conical container constitutes a first conical container and wherein the improvement further includes a second conical container concentrically located and substantially uniformly spaced from the interior of the first conical container and surrounding the one end of the fluid conduit, said second container having one end connected to the deflector in a manner similar to said first conical container to receive therefrom a portion of the fluid in circular motion, the other end of said second conical container being open similar to said first conical container, said second container providing a second surface similar to the interior surface of the first conical container to which the materials and the substances of high mass and density are directed by the centrifugal force of the fluid in circular motion and are separated from the fluid.

3. The cyclone separator described in claim 2 wherein the improvement further includes a second interceptor ring externally attached to said second conical container juxtaposed the open end of said second conical container , said ring having a surface thereon which extends radially from the outer surface of said second conical container for intercepting fluid which may flow longitudinally along the outer surface of said second conical container and deflect the longitudinal flow away from the outer surface of said second conical container toward the interior surface of said first conical container.

4. The improved cyclone separated described in claim 1 wherein said circumferential slot between said ring and said flared end of said collar is substantially semi-circular in cross-section and wherein said diameter of said diffuser collar is larger than said diameter of said interceptor ring whereby the fluid flow along the outer surface of the conduit traverses the opening of said circumferential slot to produce a pressure difference across said semi-circular cross-section to enhance fluid flow from the interior of said diffuser collar through said circumferential slot.

5. A cyclone fluid separator comprising:

deflecting means for receiving and generating spiral motion in a fluid for centrifugally separating substances and materials in the fluid having a mass and density per unit volume greater than the fluid;

container means for confining said spiral motion, said container means having two open ends, one of said ends being connected to and closed by said deflecting means, the other of said ends being oppositely disposed said deflecting means and through which opening unwanted substances and materials of a mass and density per unit volume greater than the fluid may exit;

conduit means located on the center line of said container means and passing through said deflecting means and having one end centrally located within said container means and the other end located external to said container means through which the fluid separated from the unwanted substances and materials may exit;

a flange attached adjacent to said one end of said conduit means and projecting outwardly from the exterior surface thereof, said flange having a surface thereon for deflecting longitudinal flow of fluid adjacent the surface of said conduit means outwardly toward the interior surface of said container means where the spiral fluid motion causes the unwanted materials and substances to contact the container surface and exit through said opening in said container and whereby the fluid separated from the materials and substances forms a vortex which exits through said fluid conduit; and a diffuser collar having two oppositely disposed ends and connected to said flange in a manner leaving a circumferential opening between said flange and said collar, said collar having a flared end adjacent said flange, which flared end has a diameter substantially the same as said flange to produce a pressure difference through said circumferential opening to force unwanted substances and materials radially outward through said circumferential opening to obtain further separation of the unwanted substances and materials from the fluid vortex flowing through said conduit means.

6. The cyclone separator described in claim 4 wherein said container means constitutes a first container means and wherein said separator further comprises second container means symmetrically located within and substantially informly spaced from the interior of said first container means and having two open ends and surrounding the one end of said fluid conduit means, said second container means having one end connected to said deflecting means in a manner to receive a portion of the fluid in spiral motion, the other end thereof being open, said second container means providing a second surface similar to said first container means to which the unwanted materials and substances are directed and separated from the fluid spirally flowing within said second container means.

7. The cyclone separator described in claim 5 further having a circumferential slot in said container located in proximity to said circumferential opening between said flange and said diffuser collar.

8. The cyclone separator described in claim 7 further including a second flange attached to said diffusion collar adjacent to the end opposite said flared end and a second circumferential slot in said container in proximity to said second flange.

9. The cyclone fluid separator described in claim 5 wherein said circumferential opening between said flange and said collar is substantially semi-circular in cross-section and wherein said diameter of said diffuser collar is larger than the diameter of said flange.

10. The cyclone separator described in claim 5 further having a plurality of spaced longitudinal slots in said container located in proximity to said circumferential opening between said flange and said diffuser collar.

11. An improved cyclone separator of the type having a fluid deflector comprising means adapted to receive a fluid and impart circular motion thereto, and wherein the fluid deflector is attached to and closes the base of a conical container, which container has an outlet at the apex thereof from which unwanted materials and substances of a mass and density greater than the fluid may exit and be removed from the fluid and wherein a fluid conduit is located along the center line of the conical container and passes through the fluid deflector which conduit has one end centrally located within the conical container and the other end located external thereto, and wherein an axial vortex of fluid separated from the unwanted materials and substances is formed in the container, which vortex spirals into the one end of the fluid conduit and exits from the other end, the improvement comprising:

an interceptor ring having outer and inner circumferences, the inner circumference mating with and being circumferentially attached externally to the fluid conduit near the one end of the fluid conduit centrally located within the conical container, said ring extending radially outward from said inner circumference to said outer circumference to intercept fluid which flows longitudinally along the outer surface of the conduit and deflect the longitudinal flow radially outward from the center surface of the conduit whereby unwanted materials and substances are impinged against the conical container interior surface and exit through the apex opening therein; and a diffuser collar substantially uniformly spaced from the fluid conduit and surrounding the one end of the fluid conduit, said diffuser collar having two ends, one end being attached to said outer circumference of said interceptor ring and having spiral vanes which spiral radially inwardly from said outer circumference to contact and connect to the outer surface of the fluid conduit adjacent said interceptor ring, the other end of the diffuser collar being open, whereby the vortex of fluid which spirals toward the one end of the fluid conduit has the outer layer skimmed therefrom by the uniform space between the fluid conduit and said diffuser collar, which skimmed layer spirals between said diffuser collar and the fluid conduit and is intercepted by said spiral vanes and ejected outwardly into the conical container.

* * * * *